United States Patent [19]

Fehringer

[11] Patent Number: 5,485,072
[45] Date of Patent: Jan. 16, 1996

[54] PROCESS FOR OPERATING PERMANENTLY EXCITED SINGLE-PHASE ALTERNATING CURRENT MACHINES

[75] Inventor: Rudolf Fehringer, Vienna, Austria

[73] Assignee: J. M. Voith Gesellschaft M. B. H., Heidenheim, Germany

[21] Appl. No.: 137,166

[22] PCT Filed: Apr. 28, 1992

[86] PCT No.: PCT/AT92/00060

§ 371 Date: Nov. 3, 1993

§ 102(e) Date: Nov. 3, 1993

[87] PCT Pub. No.: WO92/20142

PCT Pub. Date: Nov. 12, 1992

[30] Foreign Application Priority Data

Apr. 29, 1991 [AT] Austria ................................ A892/91

[51] Int. Cl.$^6$ ................................ H02P 6/08; H02P 5/40
[52] U.S. Cl. ........................ 318/723; 318/721; 318/254
[58] Field of Search ...................... 318/700, 701, 318/720, 721, 722, 723, 254, 439, 138

[56] References Cited

U.S. PATENT DOCUMENTS

| 4,900,993 | 2/1990 | Yasohara et al. | 318/254 |
| 5,051,641 | 9/1991 | Weh | 310/163 |

FOREIGN PATENT DOCUMENTS

| 0295710 | 12/1988 | European Pat. Off. | H02P 6/02 |
| 3705089 | 8/1988 | Germany | H02K 21/00 |
| WO88/06375 | 8/1988 | WIPO | H02K 29/00 |

OTHER PUBLICATIONS

Patent Abstracts of Japan, vol. 003, No. 71 (Group E–118), published Jun. 20, 1979, of Japanese Patent Publication No. 54–050,813 (Sanyo Electric Co Ltd), published Apr. 21, 1979.

Patent Abstracts of Japan, vol. 010, No. 197 (Group E–418), published Jul. 10, 1986, of Japanese Patent Publication No. 61–039,885 (Yaskawa Electric Mfg Co Ltd), published Feb. 26, 1986.

Patent Abstracts of Japan, vol. 009, No. 280 (Group E–356), published Nov. 8, 1985, of Japanese Patent Publication No. 60–121,987 (Mitsubishi Denki K.K.), published Jun. 29, 1985.

IEEE Transactions on Energy Conversion, vol. 5, No. 3, Sep. 1990, New York, N.Y., pp. 558–564, D. D. Sudhoff, "Operating Modes of the Brushless DC Motor with a 120° Inverter".

*Primary Examiner*—Bentsu Ro
*Attorney, Agent, or Firm*—Sandler, Greenblum & Bernstein

[57] ABSTRACT

A method and apparatus is provided for operating a permanently excited single-phase alternating current machine, otherwise known as a transverse flux machine, which allows optimal exploitation of the machine and economical design of the converter. A terminal voltage is applied to the machine, the shape of which is defined by the characteristics of the machine. The waveform of the terminal voltage converts from a sinusoid to a square wave, with a maximum voltage equal to the maximum available voltage, at defined switch-over times. Based on the switch over times, the resulting terminal voltage wave can be square, completely sinusoidal, or a combination of both.

4 Claims, 3 Drawing Sheets

PROCESS FOR OPERATING PERMANENTLY EXCITED SINGLE-PHASE ALTERNATING CURRENT MACHINES

BACKGROUND OF THE INVENTION

The invention relates to a process for operating permanently excited single-phase alternating current machines.

One embodiment of a permanently excited single-phase alternating current machine is the transverse flux machine. These machines are permanently excited synchronous machines with a high power density combined with very low losses from the armature winding. Powered by inverse rectifiers, these machines will in the near future probably replace the direct current drive in many and varied fields of application, such as direct drives with a very high power density, traction drives with the correct distribution of drive momentum to various drive assemblies and with a high level of efficiency, and linear drives.

The principle of the transverse flux machine is based on the fact that, due to the special layout of the magnetic circuit, the usable flux runs transverse to the direction of motion. The forms of the armature winding thereby possible—annular windings in the circumferential direction—permit a high power density with a small armature through-flow and a small pole pitch. This results in very minor losses, which increases efficiency and substantially simplifies cooling of the machine. The transverse flux machine has a further advantage in the field weakening range, where, with a constant power supply, a large r.p.m. range can be covered. In the field weakening range of a transverse flux machine, the range referred to is the one where the internal voltage of the machine exceeds the intermediate circuit voltage. In DE-OS 37 05 089 A1, a circuit concept for the power supply of a double-strand transverse flux machine is described. The inverse rectifier here consists of two 4-quadrant plates. The inverse rectifier is timed in pulsed mode operation in order to adapt the voltage. The direct current can therefore be obtained from the three-phase mains via an unregulated converter. If accelerated commutation is desired, avoiding pulsed mode operation, the circuit has to be enlarged. A direct current actuator controls the effective voltage in the working phase. The level adjuster forms the commutation voltage which is applied to the inverse rectifier via the direct current actuator. The level adjuster can in this case adjust the commutation voltage as a function of various parameters, such as the r.p.m. or load current, for example.

The disadvantage of this circuit concept is that an economical arrangement of the frequency converter and optimum adaptation to user requirements, exploiting all the advantages of the transverse flux machine, are not possible.

SUMMARY OF THE INVENTION

The object of the invention is therefore to create a process for operating a permanently excited single-phase alternating current machine which permits both optimum use of the machine and an economical arrangement of the frequency converter.

The object is achieved by the invention. This process is characterised according to the invention in that, by impressing specified wave forms on a terminal voltage, the effective value of a phase current of the alternating current machine can be minimised, whilst the torque is at a maximum.

With the invention of this process, it is possible for the first time to use frequency converters designed with economy in mind for supplying a permanently excited, single-phase alternating current machine, such as a transverse flux machine for example, and at the same time to exploit all the advantages of this machine for a wide variety of applications.

According to a feature of the invention, the terminal voltage has alternating sinusoidal components and regions between first and second switch-over times, within which the terminal voltage assumes the maximum value of the available voltage. The advantage of this feature is that, due to the impressing of this special wave form, in the overdrive range of the machine, the effective value of the phase current of the machine is limited to a minimum, and a maximum torque is obtained. This is achieved by using the inductance of the machine as an energy store.

In an improvement of the invention the terminal voltage has a square shape, the terminal voltage assuming the maximum value of the available voltage. The advantage of this improvement is that it offers for the first time the possibility of minimising the phase current at maximum torque even in the field weakening range of the machine. This makes it possible to optimise the layout of the frequency converter also.

According to an embodiment of the invention, the terminal voltage has a sinusoidal form. The advantage of this embodiment is that even in the basic r.p.m. range of the machine the ratio of the phase current to the torque is optimised.

In a special embodiment of the invention, the alternating current machine is a transverse flux machine, and a measured value for the angle of rotation of the alternating current machine, a circuit frequency forming a differentiating control circuit member from the angle of rotation, a preselected moment, and an intermediate circuit voltage are each capable of being fed into a first and second control device, and the first control device calculates switch-over times for switching over to an intermediate circuit voltage, according to the polarity of the voltage within the half-period, and passes these switch-over times to a trigger device of voltage source inverter, and the second control device forms a reference terminal voltage and thus supplies the trigger device of the voltage source inverter. The advantage of this special embodiment is that the curve of the terminal voltage of the machine is optimised as a function of the preselected moment by reference to the inverse motor model in order to generate current. This permits exact adaptation of the machine to the requirements of the respective field of use.

DESCRIPTION OF THE PREFERRED EMBODIMENTS

Figure 1:
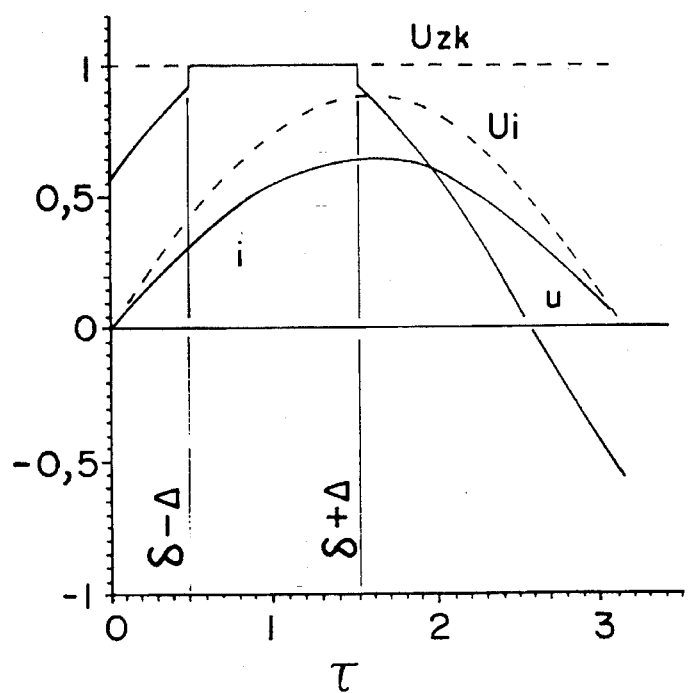
FIG. 1 shows the waveform applied by the preferred embodiment of the present invention during an overdrive range of the machine.
Figure 2:
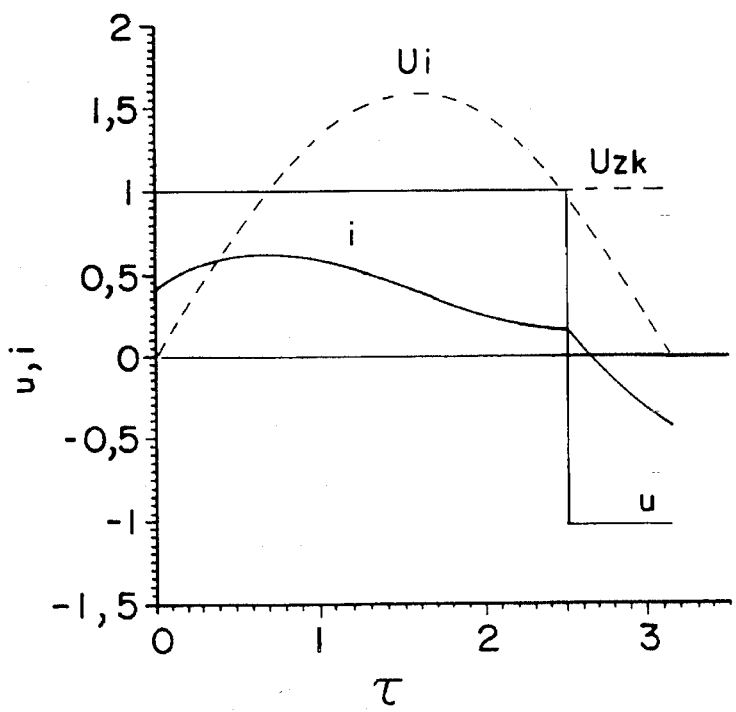
FIG. 2 shows the waveform applied by the preferred embodiment of the present invention during a field weakening range of the machine.
Figure 3:
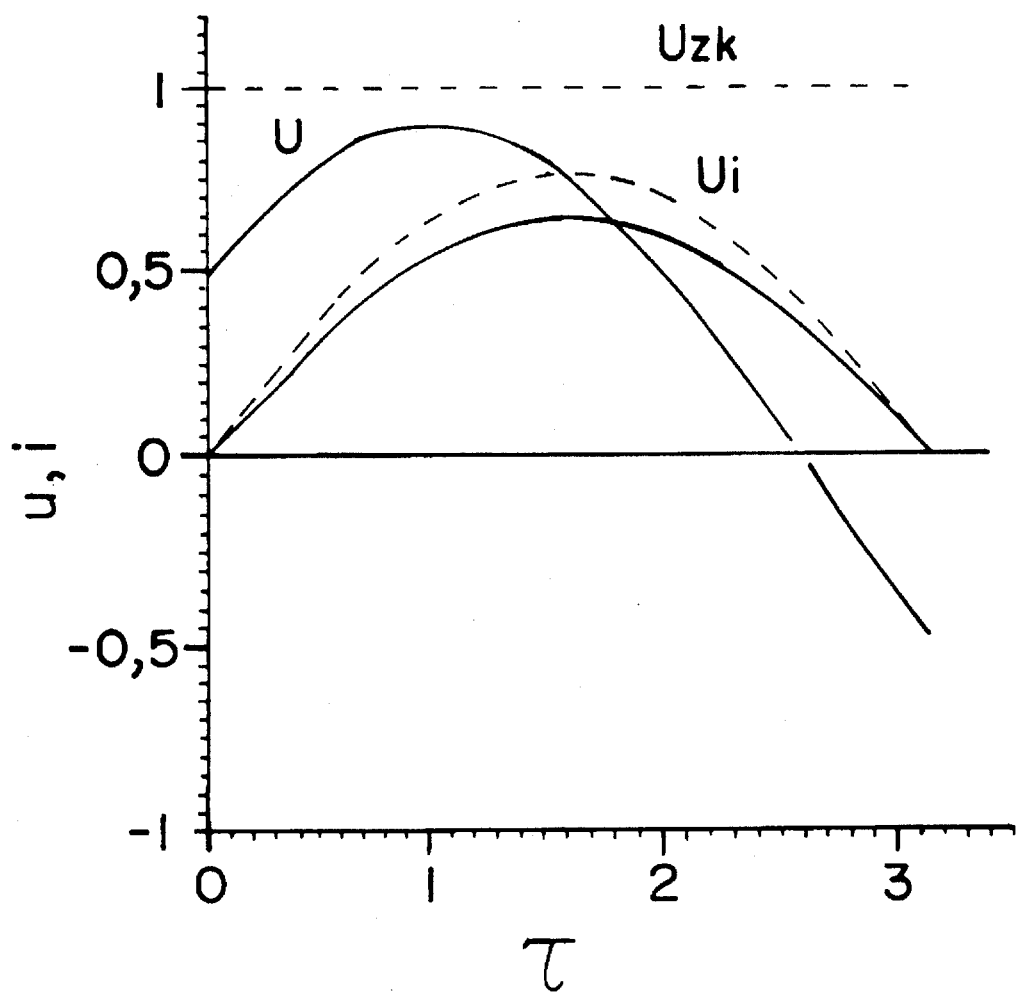
FIG. 3 shows the optimal waveform applied by the preferred embodiment of the present invention.

The same reference numbers are used in FIGS. 1 to 3. On the abscissa in each case the standardised time $\tau$ is plotted, which is calculated from the angle of rotation $\phi$ multiplied by the pole pair number p. The ordinate in each case has a standardised scale extending from −1.00 or −1.50 through 0 to +1.00 or +2.00 respectively and applies both to the impressed terminal voltage u and to the phase current i and the internal voltage of the machine $u_i$. The value for the intermediate circuit voltage $U_{zk}$ in each case lies at +1.00. In each case only the positive half-wave is shown, as the same curves obviously apply to the negative half-wave.

FIG. 1 shows the overdrive range of the machine. It shows the impressed terminal voltage u, which sinusoidal components and a range between the switch-over times $\delta-\Delta$ and $\delta+\Delta$, where the voltage assumes the intermediate circuit voltage $U_{zk}$. The essential point is that the terminal voltage u does not simply run into the intermediate circuit voltage $U_{zx}$, but has to assume the maximum value at the specified switch-over time $\delta-\Delta$. The phase current i shown here is thus kept to a minimum.

The terminal voltage u shown in FIG. 2 applies to the field weakening range of the machine. The optimum curve of the terminal voltage u is square. By minimising the phase current i in this operating range of the machine, it is possible to optimise the layout of the frequency converter also.

The terminal voltage u in FIG. 3 is sinusoidal and is the best wave form for the basic r.p.m. range of the machine. Thus in this operating range of the machine also, it is possible to minimise the phase current, which gives a very favourable ratio between the phase current and the torque.

Figure 4:
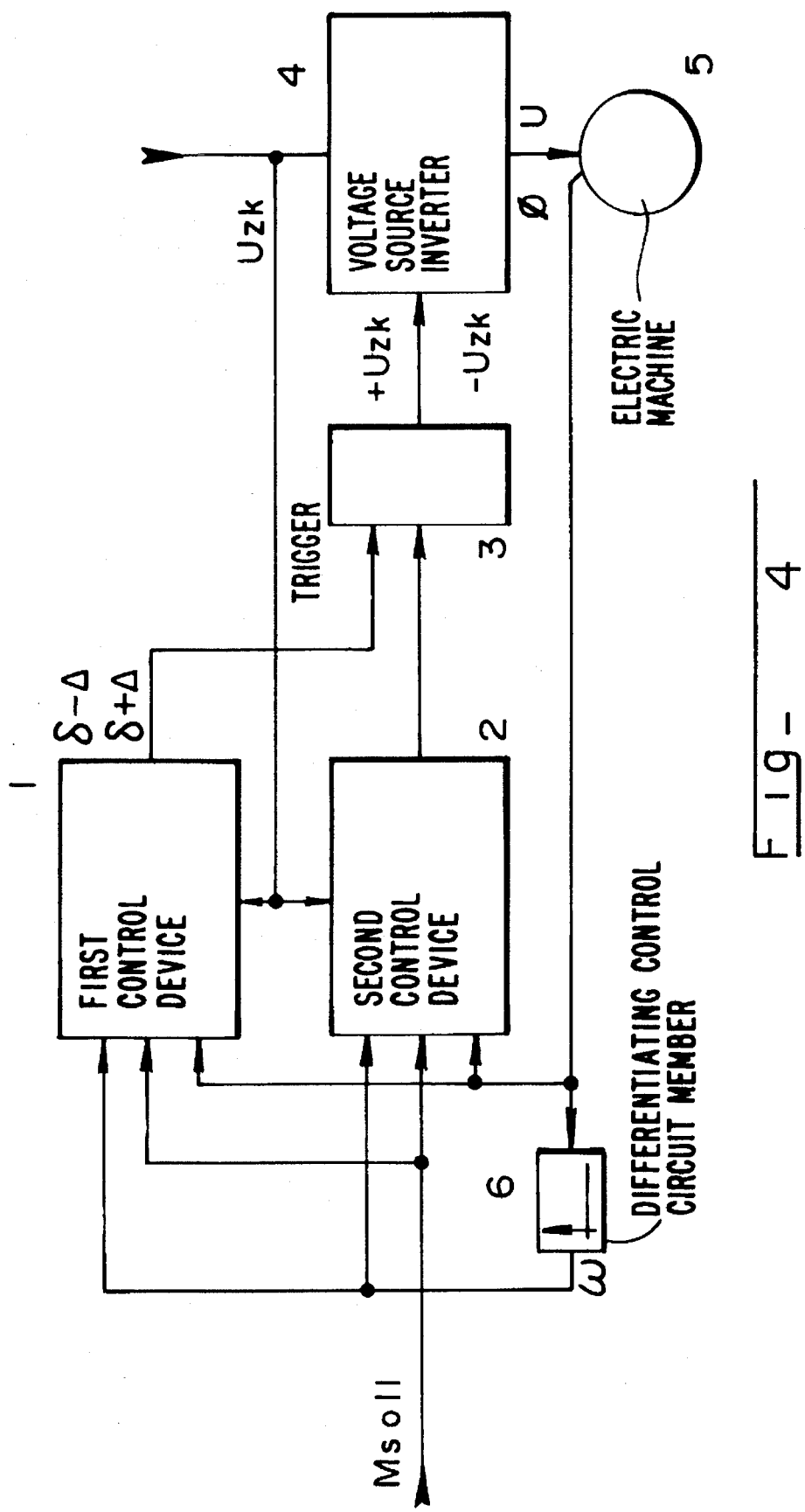
FIG. 4 is a block diagram of the preferred embodiment of the present invention.

FIG. 4 shows the block circuit diagram of one embodiment, wherein the electric machine 5, a transverse flux machine, supplies the measured value, "angle of rotation". This measurement is converted in a differentiating control circuit member 6 into the circuit frequency ω. The angle of rotation φ, the circuit frequency ω, the preselected moment $m_{soll}$, and the intermediate circuit voltage $U_{zk}$ are each fed into the first and second control device 1, 2. The first control device 1 then calculates the switch-over time $\delta-\Delta$ or $\delta+\Delta$ for the intermediate circuit voltage $-U_{zk}$ or $+U_{zk}$, according to the polarity of the voltage within the half-period. These switch-over times $\delta-\Delta$, $\delta+\Delta$ are then passed on to the trigger device 3 of voltage source inverter 4. The second control device 2 carries out the voltage formation by means of a calculation, with reference to the inverse motor model and as a function of the preselected moment $m_{soll}$, and likewise feeds this to the trigger device 3 of the voltage source inverter 4.

I claim:

1. Process for operating a permanently excited single-phase alternating current machine, the process comprising:

applying a terminal voltage (u) by means of a frequency converters, said terminal voltage (u) having sinusoidal components and regions between first and second switch-over times ($\delta-\delta$, $\delta+\Delta$), within which said terminal voltage (u) assumes the maximum value of an available voltage, wherein the effective value of a phase current (i) of the alternating current machine can be minimized whilst the torque is at a maximum.

2. Process according to claim 1, wherein the terminal voltage (u) has a square wave form, the terminal voltage (u) assuming the maximum value of the available voltage.

3. Process according to claim 1, wherein the terminal voltage (u) has a sinusoidal wave form.

4. Process according to claim 1, further comprising:

feeding angle of rotation (ω) of said alternating current machine, a circuit frequency (φ), a preselected moment ($m_{soll}$), and an intermediate circuit voltage ($U_{zk}$) into first and second control devices;

calculating, in said first control device, switch-over times ($\delta-\Delta$, $\delta+\Delta$) for switching over to an intermediate circuit voltage ($+U_{zk}$) or ($+U_{zk}$), according to the polarity of the voltage within the half-period;

passing said switch-over times ($\delta-\Delta$, $\delta+\Delta$) to a trigger device corresponding to a voltage source inverter; and forming, in said second control device, a reference terminal voltage ($U_{soll}$) which supplies said trigger device of said voltage source inverter.

* * * * *